(12) United States Patent
Kirby

(10) Patent No.: US 8,403,637 B2
(45) Date of Patent: Mar. 26, 2013

(54) THERMAL CONTROL SYSTEM FOR TURBINES

(75) Inventor: Stuart J. Kirby, Derby (GB)

(73) Assignee: Rolls-Royce PLC, London (GB)

( * ) Notice: Subject to any disclaimer, the term of this patent is extended or adjusted under 35 U.S.C. 154(b) by 552 days.

(21) Appl. No.: 12/706,732

(22) Filed: Feb. 17, 2010

(65) Prior Publication Data
US 2010/0260598 A1 Oct. 14, 2010

(30) Foreign Application Priority Data

Apr. 8, 2009 (GB) .................... 0906059.1

(51) Int. Cl.
F01D 11/24 (2006.01)
(52) U.S. Cl. ............... 415/176; 415/108; 415/173.1; 415/177
(58) Field of Classification Search .......... 60/806; 415/108, 170.1, 173.1, 176, 177
See application file for complete search history.

(56) References Cited

U.S. PATENT DOCUMENTS

| 5,100,291 | A | 3/1992 | Glover | |
|---|---|---|---|---|
| 5,205,115 | A | 4/1993 | Plemmons et al. | |
| 6,035,929 | A * | 3/2000 | Friedel et al. | 165/168 |
| 7,055,305 | B2 * | 6/2006 | Baxter et al. | 60/39.5 |
| 7,165,937 | B2 * | 1/2007 | Dong et al. | 415/173.2 |
| 8,092,146 | B2 * | 1/2012 | Legare et al. | 415/1 |
| 2002/0053837 | A1 | 5/2002 | Arilla et al. | |
| 2007/0065274 | A1 | 3/2007 | Birrell et al. | |

FOREIGN PATENT DOCUMENTS

| EP | 0 541 325 A1 | 5/1993 |
|---|---|---|
| EP | 1 798 382 A2 | 6/2007 |
| GB | 647386 | 12/1950 |
| GB | 2 217 788 A | 11/1989 |

OTHER PUBLICATIONS

Jul. 20, 2009 Search Report issued in British Patent Application No. 0906059.1.

* cited by examiner

Primary Examiner — Nathaniel Wiehe
Assistant Examiner — Justin Seabe
(74) Attorney, Agent, or Firm — Oliff & Berridge, PLC

(57) ABSTRACT

A thermal control system for a turbine casing (2) mounted radially outwardly of and circumferentially surrounding blade tips of the turbine blades, the system comprising: one or more circumferential chamber walls (6), each disposed around the casing (2), each to form a circumferential flow chamber (7) radially outward of said surface of the turbine casing (2), each to form a circumferential gap (12) between the circumferential chamber wall (6) concerned and said surface of the turbine casing (2), and the one or more circumferential chamber walls (6) define at least one opening (9) on the radially inward side of the chamber (7) adjacent the surface of the turbine casing (2) such that a thermal fluid injected into the flow chamber (7) concerned may leak out through the circumferential gap (12) via the opening (9), and means to induce circumferential flow on the surface of the casing (2) bounded by the circumferential flow chamber (7) comprising one or more ducts (8) radially outwardly connected to the or each circumferential flow chamber (7), via which the thermal fluid can be injected into the flow chamber or chambers (7) concerned in a circumferential direction.

13 Claims, 8 Drawing Sheets

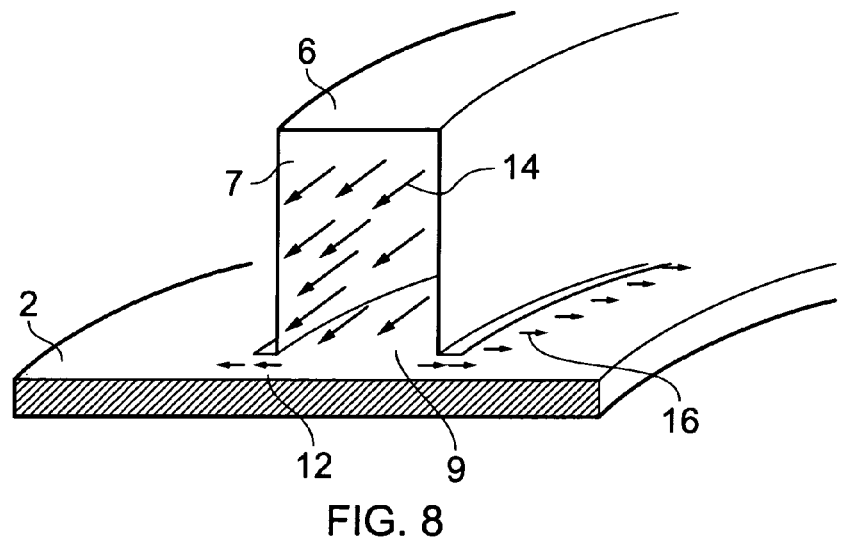
FIG. 8
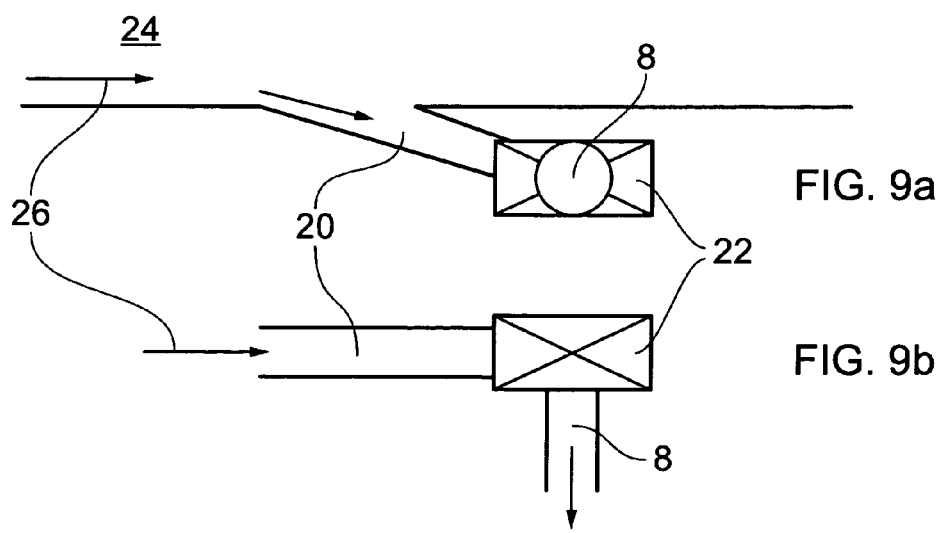
FIG. 9a
FIG. 9b

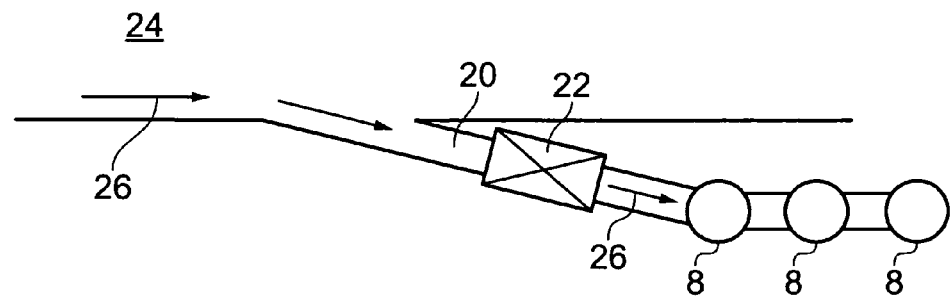
FIG. 10
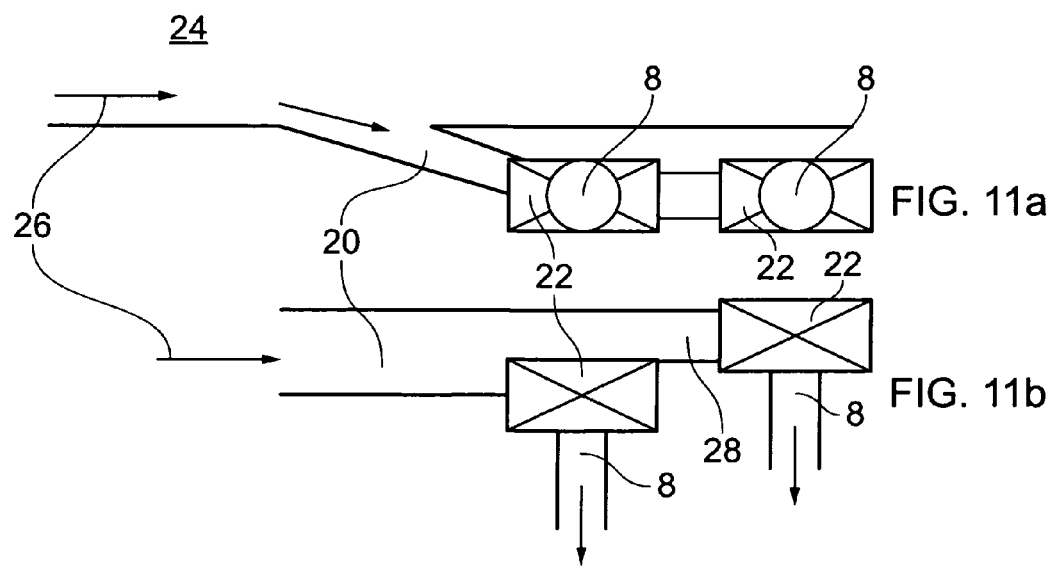

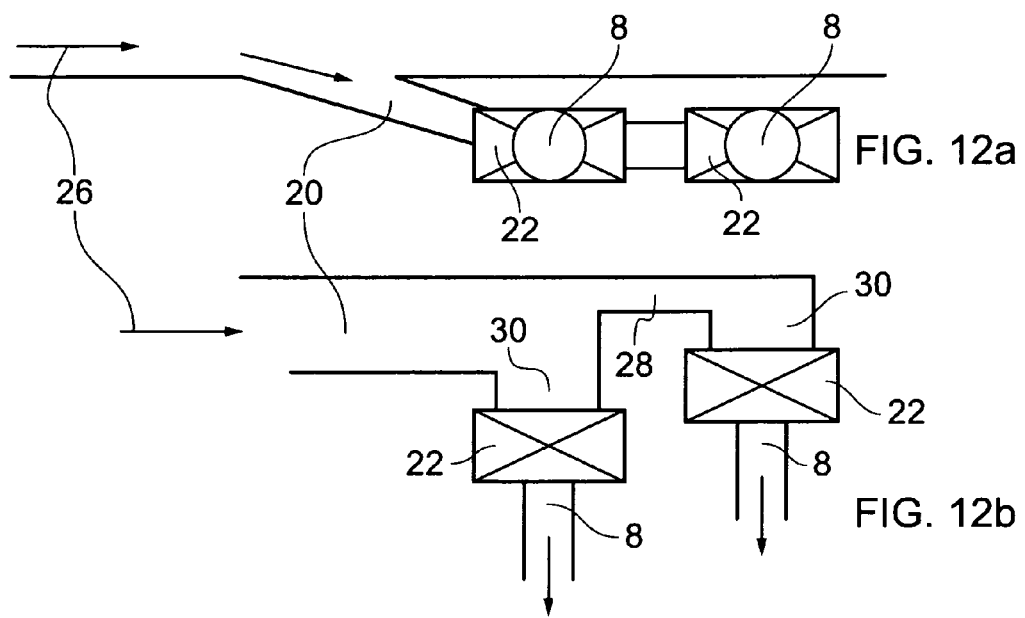

THERMAL CONTROL SYSTEM FOR TURBINES

FIELD OF THE INVENTION

The invention concerns a thermal control system for turbines.

BACKGROUND OF THE INVENTION

Efficiency of operation is of paramount importance in gas turbines, in particular aero gas turbines.

One factor reducing the efficiency of gas turbines is the thermal expansion and contraction of different turbine machinery parts associated with alterations of power. A particular issue concerns the clearances between the tips of the turbine blades and a casing which is mounted radially outwardly of and circumferentially surrounds the blade tips. For example, at the exhaust end of the gas turbine, the turbine machinery has the problem of matching the casing diameter to the tip diameter of the blades. When the turbine machinery power is altered, the casing changes diameter relatively quickly in response to the turbine gas temperature change, but a disk supporting the blades reacts more slowly. This leads to excessive tip/casing clearances, lowering the efficiency of the turbine, and therefore to higher fuel consumption. It is well known in the industry that small turbine blade tip clearances provide lower operational specific fuel consumption and hence allow large fuel savings. As a counter-measure, turbine case cooling is applied, in which cold air is blown onto the casing to control its diameter.

U.S. Pat. No. 5,205,115 discloses a system for cooling a turbine casing, wherein circumferential air suppliers located on a casing of the turbine are used to provide cooling air for the turbine casing. The air suppliers are circumferential tubes with a number of holes (so-called piccolo tubes) through which the cooling air escapes onto thermal control rings, disposed circumferentially on the casing. The thermal control rings may move a shroud radially inward or outward and thereby adjust the blade tip clearance upon thermal contraction or expansion. The cooling air is provided from the fan flow of the turbine. It is compressed from the fan and would normally be accelerated through the final nozzle of the turbine to provide thrust. Since a certain amount of cooling air is bled from the high pressure section of the turbine, a reduction of thrust or efficiency occurs.

In this setup, tight control of the geometry is necessary. In particular, the distance between the holes in the air ducts and the thermal control rings is important to provide efficient cooling. Additionally, the cooling needs to be adjusted such that no circumferential cooling gaps occur, which would lead to a distortion of the casing shape, and therefore increased wear and tear, caused by temperature differences. A further drawback results from leakages in the cooling air suppliers, which reduce the efficiency of the cooling and increase the amount of cooling air which needs to be bled from the turbine machinery, therefore reducing thrust or efficiency. Overall, the system is expensive, complicated and heavy and is prone to mechanical malfunction.

SUMMARY OF THE INVENTION

The present invention provides a thermal control system for a turbine casing according to claim 1 of the present application. According to the present invention there is provided a thermal control system for a turbine casing mounted radially outwardly of and circumferentially surrounding blade tips of turbine blades, the system comprising: one or more circumferential chamber walls, each disposed around the casing, each to form a circumferential flow chamber radially outward of said surface of the turbine casing, each to form a circumferential gap between the circumferential chamber wall concerned and said surface of the turbine casing, and the one or more circumferential chamber walls define at least one opening on the radially inward side of the chamber adjacent the surface of the turbine casing such that a thermal fluid injected into the flow chamber concerned may leak out through the circumferential gap via the opening; and means to induce circumferential flow on the surface of the casing bounded by the circumferential flow chamber comprising one or more ducts radially outwardly connected to the or each circumferential flow chamber, via which the thermal fluid can be injected into the flow chamber or chambers concerned in a circumferential direction and one or more thermal control rings circumferentially provided on a radially outward surface of the turbine casing, each of the one or more circumferential chamber walls being disposed around one or more of the thermal control rings, wherein one of the one or more circumferential chamber walls is disposed around a plurality of thermal control rings disposed on the turbine casing in the low-pressure, medium-pressure and high-pressure sections of the turbine, and wherein the thermal fluid is injected into the flow chamber through a sole duct at the low-pressure turbine flow exit end of the turbine.

The thermal control system according to the present invention has a simple configuration, therefore reducing the risk of malfunction, as well as cost. Cooling air may be provided directly onto the casing or, if present, each thermal control ring from a high pressure source such as a fan or compressor associated with the turbine, and evacuated or leaked through a circumferential gap. If the turbine forms part of a gas turbine engine, the high pressure source may be the fan or compressor which also forms part of the gas turbine engine, and which is in flow communication with the turbine. The pressure differential between the inside and the outside of the circumferential flow chamber may be very low, reducing the leakage and thereby improving efficiency of cooling. Due to the low pressure differential, the wall of a circumferential flow chamber may be moulded of a thin, light material, such as metal foil, and the wall may be made of overlapping sections of material. Furthermore, the system is flexible, and may be readily applied to turbines of differing sizes and power, which have differing operational cooling requirements.

Embodiments of the invention can provide an efficient system for controlling the blade clearance of turbine machinery, which is simple and reliable, cheap and wherein the amount of air bled from the high-pressure portion of the turbine machinery can be tightly controlled.

In this arrangement, the thermal fluid, eg cooling air, is provided into the space between the circumferential chamber and the turbine casing at the low pressure end of the turbine and the circumferential gap is disposed near the high-pressure end of the turbine. This arrangement allows the creation of a counter-flow heat exchanger, wherein the cooling air migrates in the opposite direction from the hot air, ie from the low pressure end of the turbine towards the high pressure end of the turbine. Counter-flow heat exchangers are known in the art for their superior efficiency compared to parallel flow heat exchangers.

Some embodiments of the invention are described in the dependent claims.

In an embodiment, the circumferential flow chamber wall may be attached to the ends of the one or more ducts via metal connection members. In this embodiment, the circumferential chamber wall is suspended from the ends of one or more thermal ducts, the connection between the one or more thermal ducts and the circumferential chamber possibly being the only structural feature holding the circumferential chamber in position.

In embodiments of the invention, N ducts may be disposed around the casing of the turbine at radial intervals of 360°/N, wherein N is a non-zero integer, which ducts are connected to a circumferential flow chamber, and via which ducts thermal fluid can be injected into the flow chamber concerned. For example, a circumferential flow chamber may be attached to the ends of two ducts, which are disposed at opposite sides of the casing of a turbine, ie at a circumferential interval of 180°. Similarly, a circumferential flow chamber may be attached to the ends of four ducts, which are disposed on the casing of a turbine, at regular circumferential intervals of 90°.

In embodiments of the invention, the circumferential gap and the duct or ducts (8) associated with a flow chamber may be such that injected thermal fluid can circulate around the circumferential flow chamber between 2 and 20 times before leaking out through the circumferential gap.

In further embodiments, the thermal fluid may circulate between 2 and 15 times before exiting, more preferred between 3 and 8 times.

The thermal control rings of the thermal control system according to the invention may have various shapes. For example, the cross-section of the thermal control rings may be rectangular, triangular, angled, dented, forked, or of any other shape. Different shapes of thermal control rings may be used to improve the thermal exchange between a thermal control rings and the thermal fluid, as well as to influence the flow of the thermal fluid within the space between the circumferential chamber and the thermal ring.

In embodiments of the invention, a circumferential flow chamber may narrow in cross-section, in the direction of the flow of the thermal fluid, from a position where a connection to a duct is provided. This can help to ensure even flow of the thermal fluid throughout a circumferential chamber. At the injection point, the area of the cross-section of the circumferential chamber would be in proportion to the sum of the entrained fluid flow and the injected fluid flow. The area may then linearly reduce in the flow direction, such that it is in proportion to the entrained flow just before the next injection point. With this setup, the pressure differential within different sections of the circumferential chamber may be reduced to a minimum, which ensures even flow throughout the circumferential chamber.

The thermal fluid, which is injected into the circumferential chambers of the thermal control system according to the invention may be preferably air provided from a high pressure section of the turbine machinery, such as a fan or compressor associated with the turbine. The thermal ducts of the thermal control system may lead from the high pressure part of the turbine to the injection points of the circumferential chambers. This can help ensure that the temperature control of the turbine casing is in line with the internal temperature of the turbine.

A circumferential chamber wall of the thermal control system for a turbine casing according to the present invention may be made of an insulating material. This material may be a light malleable metal sheet, which can be easily moulded into the required form. It may also consist of two layers of metal sheets comprising a gap between them, to improve insulation. It is advantageous if a circumferential chamber wall has good insulating properties, in order to ensure that thermal exchange occurs predominantly between the thermal fluid and the thermal control ring(s), and that as little heat as possible is exchanged between the thermal fluid and the inside of the turbine.

In order to further improve thermal exchange between the thermal fluid and the thermal control ring(s), turbulators may be included in the thermal control system according to the invention. The turbulators may be part of a circumferential chamber wall, a thermal control ring or the turbine casing.

In embodiments of the invention a circumferential chamber wall may be disposed around a plurality of thermal control rings disposed on the turbine casing in the low-pressure, medium-pressure and high-pressure sections of the turbine, and the thermal fluid may be injected into the flow chamber through thermal ducts at the low-pressure end of the turbine and in the intermediate pressure turbine portion and/or the high pressure turbine portion. This arrangement also allows the creation of a counter-flow heat exchanger, wherein the thermal fluids, eg cooling air, migrates in the opposite direction from the hot air, ie from the low pressure end of the turbine towards the high pressure end of the turbine.

A gas turbine comprising a thermal control system as described herein is also part of the invention.

Exemplary embodiment of the invention will now be described in more detail with reference to the attached drawings.

BRIEF DESCRIPTION OF THE DRAWINGS

FIG. 8 shows a schematic perspective view of a portion of a thermal control system according to a further embodiment of the invention; flows are indicated by arrows;

FIGS. 9a and 9b show side and plan sectional views of a duct arrangement for inducing circumferential flow according to the present invention; flows are indicated by arrows;

FIG. 10 shows a side sectional view of an alternative duct arrangement for inducing circumferential flow according to the present invention; flows are indicated by arrows;

FIGS. 11a and 11b shows a side and plan sectional view of a further duct arrangement for inducing circumferential flow according to the present invention; flows are indicated by arrows;

FIGS. 12a and 12b shows a side and plan sectional view of a further alternative duct arrangement for inducing circumferential flow according to the present invention; flows are indicated by arrows.

DETAILED DESCRIPTION OF EMBODIMENTS OF THE INVENTION

Figure 1:
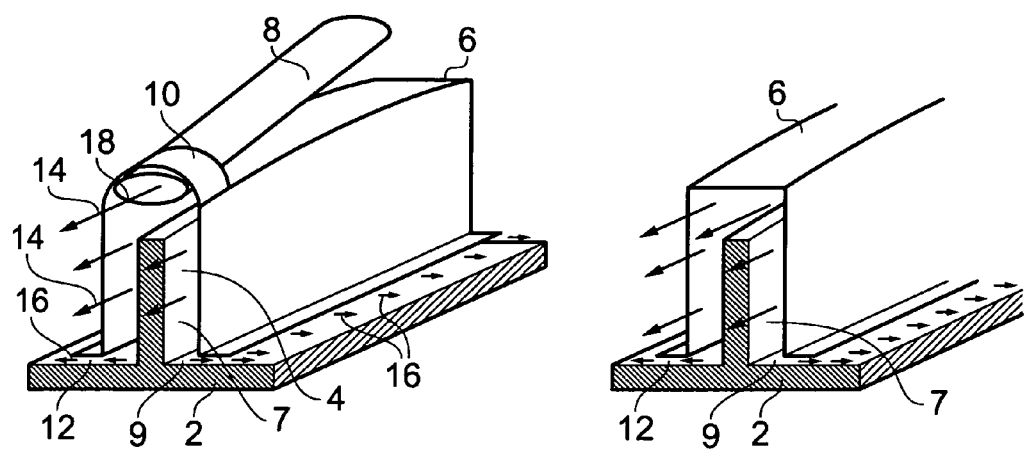
FIG. 1 shows schematic perspective views of portions of a thermal control system according to an embodiment of the invention; flows are indicated by arrows.

As illustrated in FIG. 1, thermal fluid, typically air, flows, in a direction circumferential of a turbine machinery casing 2 which is mounted radially outwardly of and circumferentially surrounding turbine blade tips of turbine blades of a turbine (not shown), through a circumferential flow chamber 7 between a thermal control ring 4, typically a dummy flange on the casing 2 as indicated in FIG. 1, and a circumferential chamber wall 6. A dummy flange is a flange which plays no part in mounting the casing in the engine or other equipment of the turbine assembly. The thermal control ring 4 is mounted on a radially outward surface of the turbine casing 2 and the flow chamber 7 is located radially outwardly of that surface. Hence there is a region of the casing 2 which is bounded by the circumferential flow chamber 7. The circumferential chamber walls 6 define an opening 9 on the radially inward side of the chamber 7 adjacent the surface of the turbine casing 2. The embodiment shown comprises one opening 9. In other embodiments (not shown), more than one opening 9 may be provided. Means to induce circumferential flow in the circumferential flow chamber 7 are provided by a duct 8 connected radially outwardly to the flow chamber 7, in other words at the top of the chamber. Thermal fluid is supplied or injected into the chamber 7 as a high speed jet, indicated by arrows 18, in a circumferential direction to induce circumferential flow in the flow chamber 7 along the surface of the casing 2 in the region of the casing 2 bounded by the circumferential flow chamber 7. In the embodiment shown, the duct 8 intercepts the chamber 7 at such an angle that flow is directed circumferentially around the flow chamber 7. The angle is preferably less than 20 degrees to the direction of flow around the flow chamber 7.

This high speed jet 18 entrains thermal fluid already in the chamber 7 to an entrained flow, indicated by arrows 14, in the chamber which may then effectively circulate or swirl in the chamber and, because the chamber 7 is open at the side adjacent the casing 2 by virtue of the opening 9, around the surface of the casing 2 for a number of revolutions, before escaping from the chamber 7. The movement of the entrained flow elevates the heat transfer from the thermal control ring 4 and casing 2 into the thermal fluid, e.g. air, through turbulence and mixing and so enhances the turbine casing cooling.

The thermal fluid is allowed to escape from the chamber 7 between the thermal control ring 4 and the circumferential chamber wall 6 via the opening 9 and a gap 12 at the bottom of the chamber, left between the turbine machinery casing 2 and the circumferential chamber wall 6, as leakage flow indicated by arrows 16.

The gap 12 between the casing 2 and the circumferential chamber wall 6 can be large enough to ensure that between the casing and the circumferential chamber wall there is no significant pressure drop between the inside and outside of the flow chamber 7. Further, the amount of thermal fluid leaking from the flow chamber 7 may be adjusted by adapting the width of gap 12. By varying the area and velocity of the high speed jet 18 and the area of the entrained flow 14, the turbine casing thermal control system may be adjusted such that the thermal fluid effectively circulates in the flow chamber 7 in an entrained flow a certain number of times before leaving the chamber through gap 12, such as that the thermal fluid circulates for example between 2 and 20 times, or between 2 and 15 times or between 3 and 8 times before exiting though the gap 12. The preferred number of effective circulations of thermal fluid may depend on the type and size of turbine. With the turbine thermal control system according to the invention, the number of effective circulations may be adjusted to approach any preferred value.

FIG. 1 further illustrates that the duct 8 may be attached to the circumferential chamber wall 6 with a connection member 10, for example of metal. The connection between the thermal fluid duct 8 and the circumferential chamber wall 6 is preferably such that no thermal fluid may leak from the flow chamber 7 through the connection.

The thermal fluid used in the thermal control system is preferably air provided from a high-pressure source, such as a fan or compressor associated with the turbine. For example, if the turbine forms part of a gas turbine engine, the high pressure source may be the fan or compressor which also forms part of the gas turbine engine, and which is in flow communication with the turbine. The duct 8 may be arranged such that one end (not shown) of the duct is connected to the high-pressure source, such as the fan or compressor (not shown) and the opposite end is connected to the flow chamber 7 of a turbine thermal control system as described above. It should be noted that by bleeding air from the high pressure section of a gas turbine, thrust or efficiency of the gas turbine is reduced. Therefore the amount of air bled from the high-pressure section must be minimised in order to reduce losses.

Particularly since there may be no significant pressure drop between the inside and outside of the flow chamber 7, the circumferential chamber wall 6 may preferably made of a light and malleable material, such as thin metal foil, pressed by hand or with the assistance of rubber and a press into a simple mould. This contributes to weight saving.

Thermal control rings (eg dummy flanges) 4 may extend circumferentially continuously or may be circumferentially intermittent, or may be of different form at different circumferential positions. This is the case for all embodiments of the invention. Similarly, the gap 12 may extend circumferentially continuously or may be circumferentially intermittent, possibly with the provision of spacers aiding definition of the size of the gap, or may be different at different circumferential positions. This is the case for all embodiments of the invention.

Figure 2:
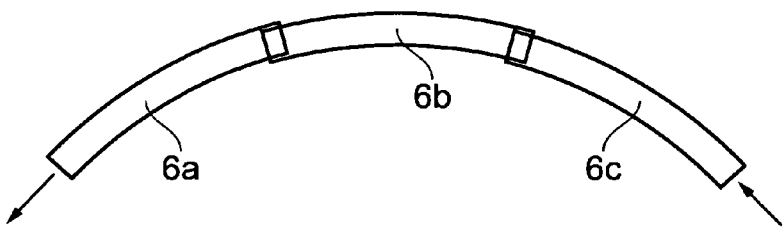
FIG. 2 schematically shows three sections of a circumferential chamber wall which is part of a thermal control system according to an embodiment of the invention; flows are indicated by arrows.

As illustrated in FIG. 2, in some embodiments of the invention, the flow chamber 7 may be formed by a number of overlapping circumferential chamber wall sections 6a, 6b, 6c, and so on, preferably arranged to give down-wind steps. Down-wind steps may be used, because they do not significantly alter the local pressures in the flow chamber 7 between the thermal control ring 4 and the circumferential chamber wall 6, thus ensuring a smooth circumferential flow of thermal fluid, and avoiding increased leakage.

In a preferred embodiment, the circumferential chamber wall 6 may be made of an insulating material, such as an insulation blanket. An insulation blanket may for example consist of two sheets of thin metal with an air layer in between, or of one layer of a material with particularly good insulating properties. The use of an insulating blanket reduces exchange of heat between the thermal fluid external to the circumferential chamber wall 6 and the thermal fluid within the flow chamber 7 between circumferential chamber wall 6 and thermal control ring 4, therefore enhancing heat exchange between the thermal fluid and thermal control ring 4.

Ideally, there would only be one injection point into the flow chamber 7 for a high-speed jet 18 (eg high pressure/velocity air) in order to provide the lightest and least expensive configuration. However, in order to promote even flow conditions, it may be necessary to employ multiple high-speed jet injection points circumferentially spaced around the outer periphery of the flow chamber 7.

Figure 3:
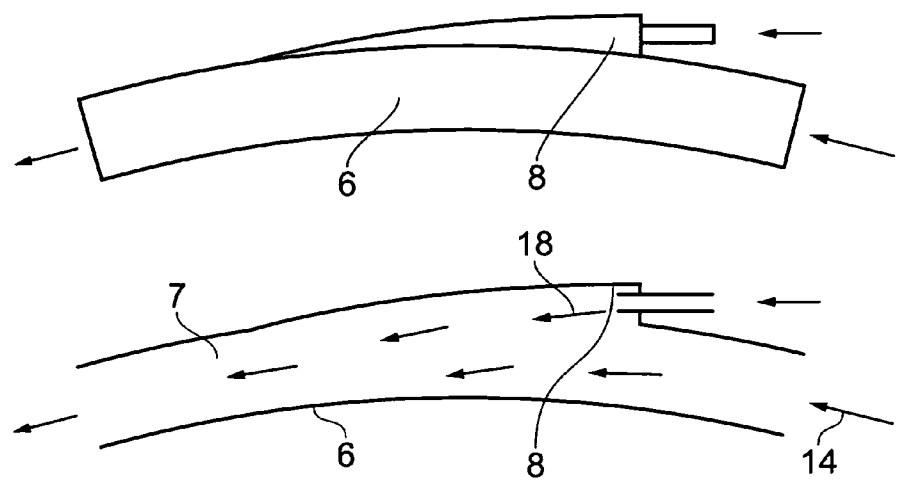
FIG. 3 schematically shows sections of a circumferential chamber wall and flow chamber according to an embodiment of the invention; flows are indicated by arrows.

In embodiments of the invention, as illustrated in FIG. 3, the cross-section of the circumferential flow chamber 7 of the thermal control system according to the invention may vary around the turbine, to thereby encourage even flow. Thus, at the injection point of the high-speed jet 18, the cross-section may be in proportion to the sum of mass flows of the entrained flow 14 and the high-speed jet injection flow 18, and then linearly reduces in the direction of the flow of the thermal fluid until just upstream of the original injection point, or next injection point if a plurality of injection points are provided, where the area of the cross-section of the circumferential flow chamber 7 is in proportion to the entrained flow 14.

In some preferred embodiments the ratio of entrained thermal fluid stream 14 to injected stream 18 is approximately 4, which implies that the thermal fluid revolves approximately 5 times around the flow chamber 7 between circumferential chamber wall 6 and thermal control ring 4 before exiting through gap 12. In other embodiments the ratio may lie between, for example 2 and 20, with the thermal fluid revolving a plurality of times around the flow chamber 7 between circumferential chamber wall 6 and thermal control ring 4 before exiting through gap 12.

There may be several injection points 8 arranged at regular intervals around a circumferential flow chamber 7 of the thermal control system according to the invention. For example, if there are two injection points into a circumferential flow chamber 7, they would be at opposite sides of the circumferential flow chamber 7. If there are four injection points, they are arranged at 90° radial intervals around the circumferential flow chamber 7. Any suitable number of injection points may be arranged on a circumferential flow chamber 7.

A combination of a number of high-speed jet injection points with a number of flow chamber wall sections (eg 6a, 6b, 6c etc as seen in FIG. 2) with appropriately reducing cross-section area of the flow chamber 7 (eg linear with circumference) from injection point to injection point may create a more even distribution with sections that could be assembled around the turbine machinery. N-jet injection points and N-flow chamber wall sections, where N is at least 2 would allow assembly of the system from two or more wall sections. The greater the number of sections the smaller would be each wall section, which could provide for more convenient storage and transportation of the sections.

Figure 4:
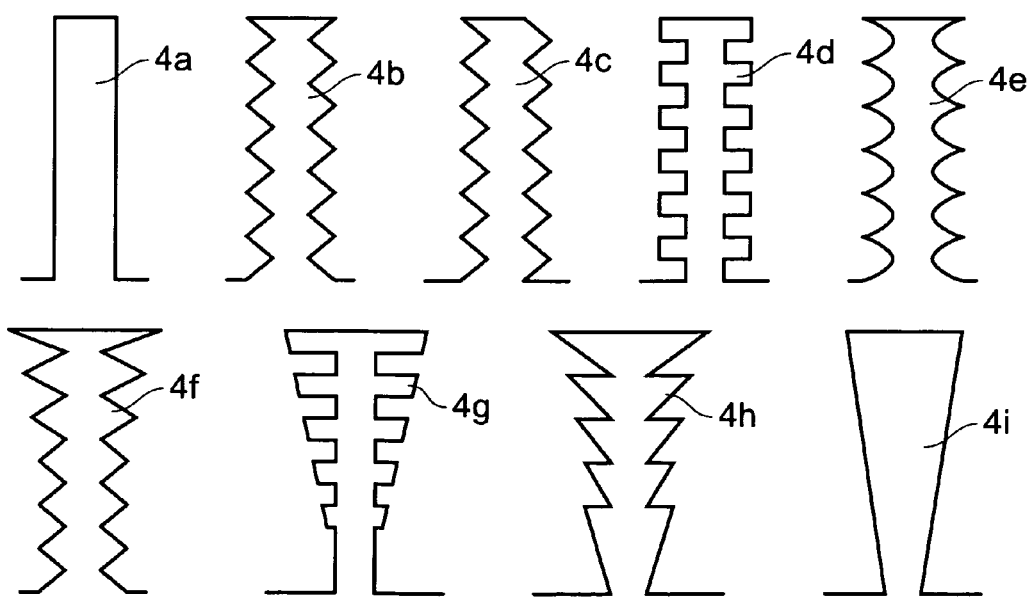
FIG. 4 schematically shows cross sections of different thermal control rings (dummy flanges) which may be used in embodiments of the invention.

The thermal control rings 4, eg dummy flanges, as part of the thermal control system may have differently shaped cross-sections 4a to 4i, as shown in FIG. 4. The shapes of the cross-sections may be rectangular, triangular, angled, dented, forked, or any other shape. The person skilled in the art will be aware that different shapes of thermal control rings may have different properties, according to the requirements of a specific turbine. For example, the shape of the cross-section of a thermal control ring 4 may influence the rate of heat exchange between the thermal fluid and the thermal control ring. In general, a larger surface area of the thermal control ring may cause a faster rate of heat exchange between the thermal fluid and the thermal control ring 4. The shape may also influence the circumferential flow of thermal fluid around the flow chamber 7 between a circumferential chamber wall 6 and a thermal control ring 4, therefore influencing local pressure of thermal control fluid, leakage through gap 12, or the number of revolutions around the circumferential chamber.

In embodiments of the invention, turbulators may be used within the flow chamber 7 between a thermal control ring 4 and a circumferential chamber wall 6. The turbulators may be used to modify the flow of thermal fluid within the flow chamber 7. For example, in certain conditions, it may be useful to increase thermal exchange between thermal fluid and thermal control ring (eg dummy flange) 4 in certain positions. Installing turbulators may lead to local high pressure of thermal fluid and thereby locally increase thermal exchange. Turbulators may also increase the surface area of thermal control rings 4 and thereby enhance heat exchange. In practice, turbulators may be installed on a thermal control ring 4, on the turbine casing 2, or, more preferably, on a circumferential chamber wall 6. Alternatively, turbulators on a circumferential chamber wall 6 may act as spacers between the circumferential chamber wall 6 and the turbine casing 2, in order to maintain the gap 12 at an equal and consistent level. For example, the turbulators may be dimples in sheet metal forming the circumferential chamber wall 6. Alternatively, turbulators may be installed on the turbine casing itself and simultaneously act as spacers, while also increasing the surface area of the turbine casing and therefore improving heat exchange.

Figure 5A:
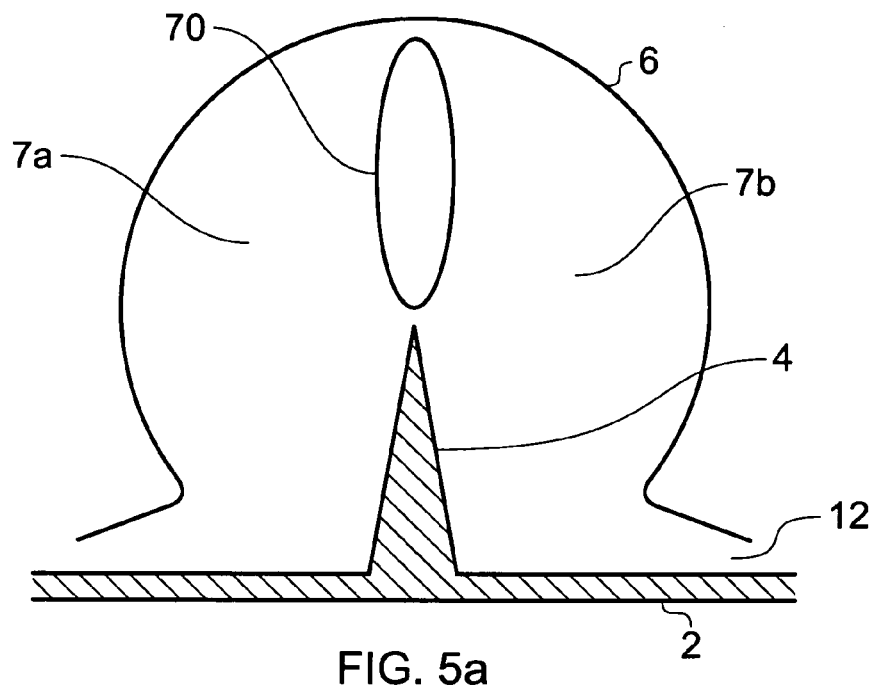
FIGS. 5a and 5b schematically show cross-sections of a circumferential flow chamber and a thermal control ring according to another embodiment of the invention; flows are indicated by arrows.
Figure 5B:
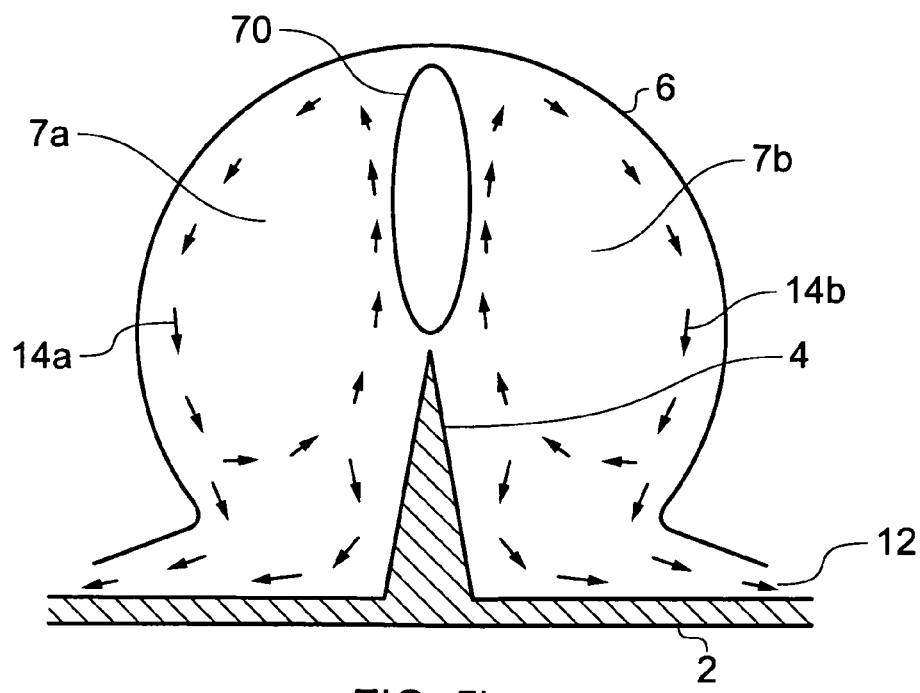

In some embodiments of the invention, as illustrated in an example in FIGS. 5a and 5b, the circumferential flow chamber 7 of the thermal control system according to the invention may be effectively divided into two flow chambers 7a and 7b. The configuration in this case is intended to encourage the recirculation of flow between radially outboard positions and radially inboard positions to enhance mixing and thus heat transfer. In the illustrated case the chamber wall 6 is made circular to minimise its surface area and thus minimise the drag that would otherwise reduce the recirculation velocity and hence, heat transfer. The thermal control ring 4 may have a triangular cross section as shown. An internal baffle member 70 between the flow chambers 7a and 7b, schematically illustrated in FIGS. 5a and 5b, in combination with the thermal control ring 4 (eg dummy flange) effectively provides for two counter-rotating flows, indicated by arrows 14a and 14b, in the cross-sections of the flow chambers 7a and 7b which, as mentioned above, encourage the recirculation of flow between radially outboard positions and radially inboard positions to enhance mixing and thus heat transfer. In this particular embodiment of the invention, with a circular cross-section of the circumferential chamber wall 6, thermal fluid flow may be controlled such that heat exchange between the thermal fluid and thermal control ring 4 is optimised by a rotating flow of the thermal fluid. This reduces the drag of the counter-rotating flows 14a, 14b that could otherwise reduce or minimise the circulation velocity of the thermal control fluid. Furthermore, in this embodiment, the surface area of the circumferential chamber wall 6 is minimised and therefore the heat exchange between the thermal fluid and the circumferential chamber 7 is reduced.

Figure 6A:
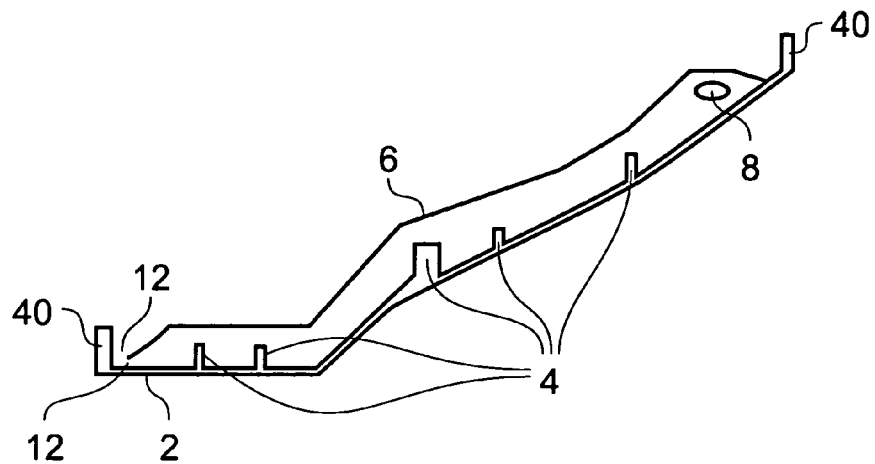
FIGS. 6a, 6b schematically show cross-sections of a portion of a turbine machinery casing with a circumferential flow chamber wall according to another embodiment of the invention, wherein flow is provided in the manner of a contra-flow heat exchanger; flows are indicated by arrows.
Figure 6B:
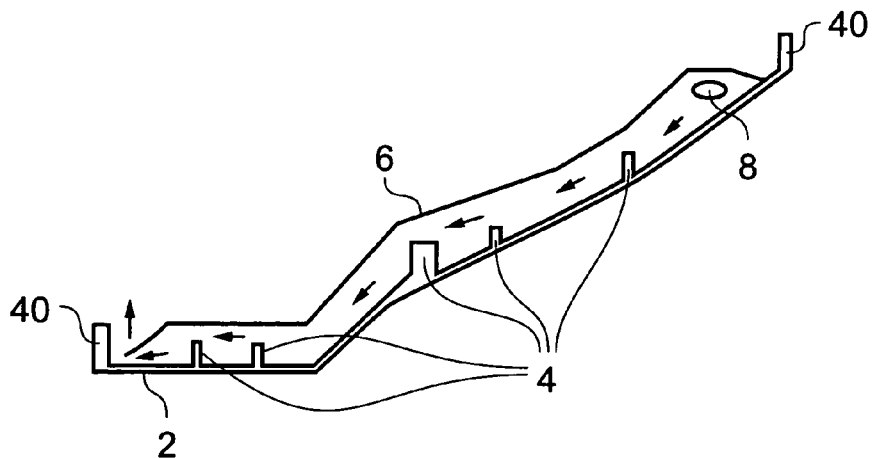

In another embodiment of the invention, as illustrated in FIGS. 6a and 6b, a circumferential chamber wall 6 is arranged on the casing 2 of a turbine in such a way that it covers a plurality of thermal control rings 4 (eg dummy flanges), which are arranged on the casing 2 of the turbine, along the high-pressure, medium-pressure and low-pressure portions of the turbine. In terms of flow through the turbine, the low pressure section is downstream of the medium-pressure section, and the medium pressure section is downstream of the high pressure section. In FIGS. 6a and 6b, the casing 2 has end mounting flanges 40 which could be used to form parts of the chamber wall 6. In this embodiment, there is only one gap 12 through which thermal fluid may leave the flow chamber between the chamber wall 6 and the thermal control rings 4, which is arranged near the high-pressure end of the turbine. The gap 12 may be taken to be the distance between the free end of the chamber wall 6 and the casing 2, or the distance between the free end of the chamber wall 6 and the adjacent flange 40, whichever is the smaller. In this embodiment of the invention, the thermal fluid duct 8 (high-speed jet injection point) is arranged near the low-pressure turbine flow exit end of the turbine. The thermal fluid flows from the injection point of the duct 8 near the low-pressure turbine flow exit end of the turbine towards the gap 12 near the high-pressure portion of the turbine. This configuration provides a contra-flow heat exchanger function. The turbine flow within the chamber wall 6 is from left to right in FIGS. 6a and 6b and as it passes through the turbine stages energy is extracted and the gas temperature reduces. Thus the internal gas temperature is very high at the left hand end and less hot at the right hand end.

The flow in the circumferential flow chamber defined between the chamber wall 6 and the casing 2 is again circumferential but is arranged so that the flow migrates from the low pressure turbine (on the right in FIGS. 6a and 6b) towards the high pressure turbine (on the left in FIGS. 6a and 6b)—hence the flow is like a contra-flow heat exchanger. Thus less thermal fluid is required to achieve adequate cooling. In an embodiment where the turbine forms part of a gas turbine engine, such a configuration results in less air being bled from the high pressure sections of fan or compressor, thereby increasing the overall efficiency of the engine.

Figure 7:
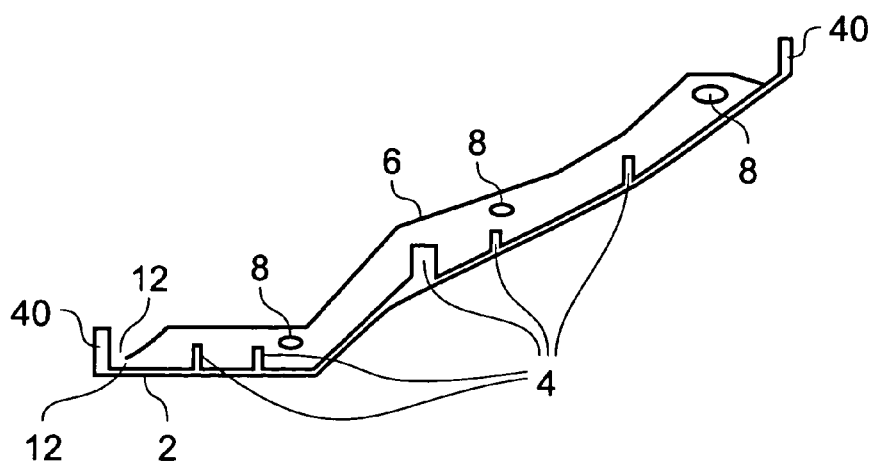
FIG. 7 schematically shows a cross-section of a portion of a turbine machinery casing with a circumferential flow chamber wall according to another embodiment of the invention, wherein flow is provided in the manner of a contra-flow heat exchanger.
Figure 13:
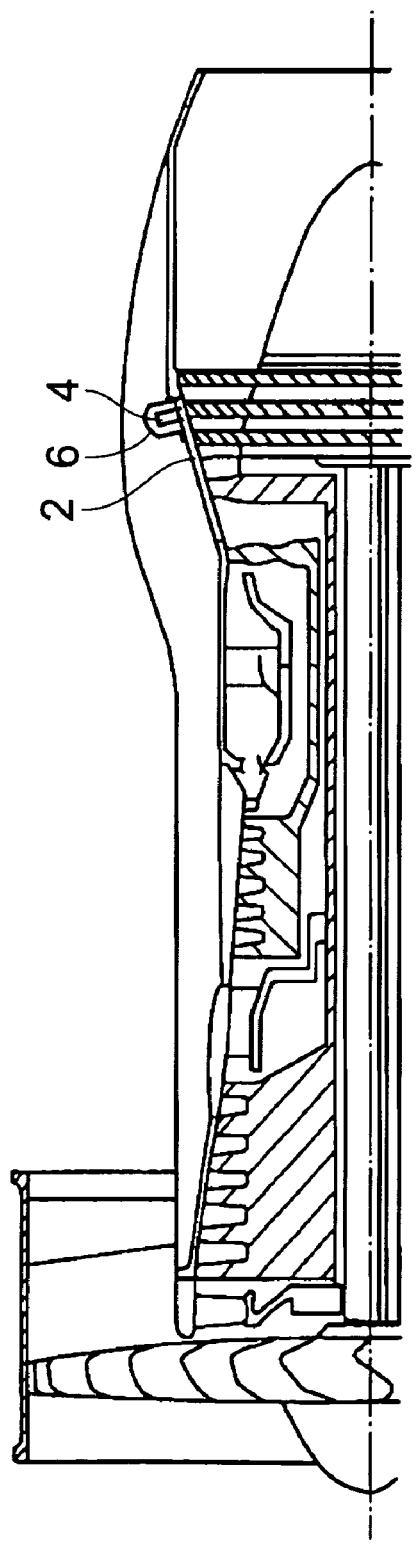
FIG. 13 shows a schematic arrangement of a gas turbine engine illustrating the placement of the thermal control system.

In a further embodiment of the invention, as shown in FIG. 7, there are additional thermal ducts 8 arranged on the circumferential flow chamber in the medium-pressure portion and/or the high-pressure portion of the turbine, providing extra thermal fluid to the flow chamber between the circumferential chamber wall 6 and the thermal control rings 4, as illustrated in FIG. 7. This arrangement may serve to re-energise the flow in the flow chamber away from the low pressure end of the turbine and so provide further improved efficiency. In FIG. 7, the casing 2 has end mounting flanges 40 which could be used to form parts of the chamber wall 6.

Shown in FIG. 8 is a further embodiment of the invention. This embodiment is essentially the same as that shown in FIG. 1, except that this embodiment does not comprise a thermal control ring. A circumferential flow chamber 7 is provided radially outward of a turbine machinery casing 2. Hence there is a region of the casing 2 which is bounded by the circumferential flow chamber 7. Thermal fluid, typically air, flows in the flow chamber 7 in a circumferential direction through the flow chamber 7 between the casing 2 and a circumferential chamber wall 6. The circumferential chamber walls 6 define an opening 9 on the radially inward side of the chamber 7 adjacent the surface of the turbine casing 2. The embodiment shown comprises one opening 9. In other embodiments (not shown), more than one opening 9 may be provided. As with the previous embodiments, a duct 8 (not shown) is provided to deliver thermal fluid to the circumferential flow chamber 7. The duct 8 is radially outwardly connected to the circumferential flow chamber 7. Thermal fluid is injected as a high speed jet, indicated by arrows 18, into the flow chamber 7 in a circumferential direction to induce circumferential flow in the flow chamber 7 along the surface of the casing 2 in the region of the casing 2 bounded by the circumferential flow chamber 7. This high speed jet 18 entrains thermal fluid already in the chamber 7 to an entrained flow, indicated by arrows 14, in the chamber which may then effectively circulate or swirl in the chamber and, because the chamber 7 is open at the side adjacent the casing 2 by virtue of the opening 9, around the surface of the casing 2 for a number of revolutions, before escaping from the chamber 7. The movement of the entrained flow elevates the heat transfer from the casing 2 into the thermal fluid, e.g. air, through turbulence and mixing and so enhances the turbine casing cooling. The thermal fluid is allowed to escape from the chamber 7 between the casing 2 and the circumferential chamber wall 6 via the opening 9 a gap 12 at the bottom of the chamber, left between the turbine machinery casing 2 and the circumferential chamber wall 6, as leakage flow indicated by arrows 16.

Further embodiments of the invention (not shown) comprise all the features described in relation to the embodiments of FIG. 6a, FIG. 6b and FIG. 7, with the exception that such further embodiments do not comprise thermal control rings. That is to say a circumferential chamber wall 6 is arranged on the casing 2 of a turbine in such a way that it extends along the casing 2 along the high-pressure, medium-pressure and low-pressure portions of the turbine. As with the embodiments of FIGS. 6a, 6b and 7, there is only one gap 12 through which thermal fluid may leave the flow chamber between the chamber wall 6 and the casing 2, which is arranged near the high-pressure end of the turbine. The gap 12 may be taken to be the distance between the free end of the chamber wall 6 and the casing 2, or the distance between the free end of the chamber wall 6 and the adjacent flange 40, whichever is the smaller. In this embodiment of the invention, the thermal fluid duct 8 (high-speed jet injection point) is arranged near the low-pressure turbine flow exit end of the turbine. The thermal fluid flows from the injection point of the duct 8 near the low-pressure turbine flow exit end of the turbine towards the gap 12 near the high-pressure portion of the turbine along the surface of the casing 2. This configuration provides a contra-flow heat exchanger function. Additional thermal ducts 8 may be arranged on the circumferential flow chamber in the medium-pressure portion and/or the high-pressure portion of the turbine, providing extra thermal fluid to the flow chamber between the circumferential chamber wall 6 and casing wall 2. This arrangement may serve to re-energise the flow in the flow chamber away from the low pressure end of the turbine and so provide further improved efficiency.

FIGS. 9, 10, 11 and 12 present a variety of different duct 8 arrangements for inducing circumferential flow in the circumferential flow chamber 7. These may be incorporated with any of the previous embodiments shown.

FIGS. 9a and 9b show side and plan sectional views respectively of a duct 8 in flow communication with an inlet 20 via a control valve 22. The inlet 20 may in turn communicate with any source of pressurised cooling air, for example the engine bypass duct 24 fed by the engine compressor or fan. Air flow into the inlet is indicated by arrows 26. The control valve 22 is actuated to regulate the flow of air to the chamber 7 (not shown), to thereby increase and decrease the amount of cooling fluid being delivered to the casing 2 (not shown).

FIG. 10 shows a side sectional view of an alternative duct 8 supply arrangement. As with the previous embodiment an inlet 20 terminates at a control valve 22. The control valve is in flow communication with a number of ducts 8, each of which is in flow communication with a circumferential flow chamber 7 (not shown).

FIGS. 11a and 11b shows a side and plan sectional view respectively of a further alternative duct 8 supply arrangement. The inlet 20 is in flow communication with a pair of control valves 22, each of which regulates flow to a different duct 8. The inlet 20 narrows in width/diameter to form an inlet branch 28 downstream of the first control valve 22. Each of the ducts 8 is in flow communication with a different circumferential flow chamber 7 (not shown), each of which are located at different regions of a casing 2 (not shown). The control valves 22 are actuated to regulate the flow of air to the chambers 7 (not shown), to thereby independently increase and decrease the amount of cooling fluid being delivered to each circumferential flow chamber 7 (not shown), and hence regulate cooling of different regions of the casing 2 (not shown).

FIGS. 12a and 12b shows a side and plan sectional view respectively of a variant of the embodiment shown in FIGS. 11a and 11b. It is the same in all respects other than each of the control valves 22 are in flow communication with the inlet 20 via a right angled bend section 30.

Overall, embodiments of the invention may be mechanically simple, inexpensive to manufacture, lighter and less susceptible to wasteful leaks than prior proposals. They may also make better use of the thermal medium—eg cooling air—thus reducing the mass flow requirement and improving the Specific Fuel Consumption of the turbine machinery through lower cooling air requirements.

Further, embodiments of the invention employing circular or rounded flow chamber and/or duct profiles may reduce the wall drag on the flows arising, this to increase the flow velocity—which enhances the heat transfer. These configurations may also encourage secondary flows that mix recirculating flows and make the cooling effect on the casing more even.

Embodiments using a contra-flow heat exchanger arrangement may further reduce requirements for thermal medium—cooling air—and so reduce parasitic losses and improve Specific Fuel Consumption.

The invention claimed is:

1. A thermal control system for a turbine casing mounted radially outwardly of and circumferentially surrounding blade tips of the turbine blades, the system comprising:
   one or more circumferential chamber walls, each disposed around the casing, each to form a circumferential flow chamber radially outward of said surface of the turbine casing, each to form a circumferential gap between the circumferential chamber wall concerned and said surface of the turbine casing, and the one or more circumferential chamber walls define at least one opening on the radially inward side of the chamber adjacent the surface of the turbine casing such that a thermal fluid injected into the flow chamber concerned may leak out through the circumferential gap via the opening,
   means to induce circumferential flow on the surface of the casing bounded by the circumferential flow chamber comprising one or more ducts radially outwardly connected to the or each circumferential flow chamber, via which the thermal fluid can be injected into the flow chamber or chambers concerned in a circumferential direction, and
   one or more thermal control rings circumferentially provided on a radially outward surface of the turbine casing, each of the one or more circumferential chamber walls being disposed around one or more of the thermal control rings,
   wherein one of the one or more circumferential chamber walls is disposed around a plurality of thermal control rings disposed on the turbine casing in the low-pressure, medium-pressure and high-pressure sections of the turbine, and wherein the thermal fluid is injected into the flow chamber through a sole duct at the low-pressure turbine flow exit end of the turbine.

2. A thermal control system for a turbine casing as claimed in claim 1, wherein the duct intercepts the chamber at an angle such that flow is directed substantially circumferentially around the flow chamber.

3. A thermal control system for a turbine casing as claimed in claim 2, wherein the angle is preferably less than 20 degrees to the direction of flow around the flow chamber.

4. A thermal control system for a turbine casing as claimed in claim 1, wherein N ducts disposed around the casing of the turbine at radial intervals of 360°/N, wherein N is a non-zero integer, are connected to a circumferential flow chamber, via which ducts thermal fluid can be injected into the flow chamber concerned.

5. A thermal control system for a turbine casing as claimed in claim 1, wherein the circumferential gap and the duct or ducts associated with a flow chamber are such that injected thermal fluid can circulate around the circumferential flow chamber between 2 and 20 times before leaking out through the circumferential gap.

6. A thermal control system for a turbine casing according to claim 5, wherein the circumferential gap and the duct or ducts associated with a flow chamber are such that injected thermal fluid can circulate around the circumferential flow chamber between 2 and 15 times, before leaking out through said circumferential gap.

7. A thermal control system for a turbine casing according to claim 5, wherein the circumferential gap and the duct or ducts associated with a flow chamber are such that injected thermal fluid can circulate around the circumferential flow chamber between 3 and 8 times, before leaking out through said circumferential gap.

8. A thermal control system for a turbine casing as claimed in claim 1, wherein a circumferential flow chamber narrows in cross-section, in the direction of the flow of the thermal fluid, from a position where a connection to a duct is provided.

9. A thermal control system for a turbine casing as claimed in claim 1, wherein the turbine is in flow communication with a fan or compressor, and the thermal fluid is air provided from the fan or compressor.

10. A thermal control system for a turbine casing as claimed in claim 1, wherein the circumferential chambers walls are made of an insulating material.

11. A thermal control system for a turbine casing according to claim 1, wherein the cross-section of the or each thermal control ring is rectangular, triangular, angled, dented, forked or any other shape adapted to influence the rate of heat exchange between the thermal fluid and the thermal control ring concerned and/or influence the circumferential flow of thermal fluid around the flow chamber in which the thermal control ring concerned is located.

12. A thermal control system for a turbine casing according to claim 1, further comprising one or more turbulators attached to a thermal control ring, the casing or a circumferential chamber wall.

13. A thermal control system for a turbine casing as claimed in claim 1, wherein a circumferential chamber wall is disposed around a plurality of thermal control rings disposed on the turbine casing in the low-pressure, medium-pressure and high-pressure sections of the turbine, and wherein the thermal fluid is injected into the flow chamber through thermal ducts at the low-pressure end of the turbine and in the intermediate pressure turbine portion and/or the high pressure turbine portion.

* * * * *